Jan. 18, 1938.    O. J. GROSS ET AL    2,106,001
THERMOSTATIC CONTROL DEVICE
Filed Nov. 17, 1933
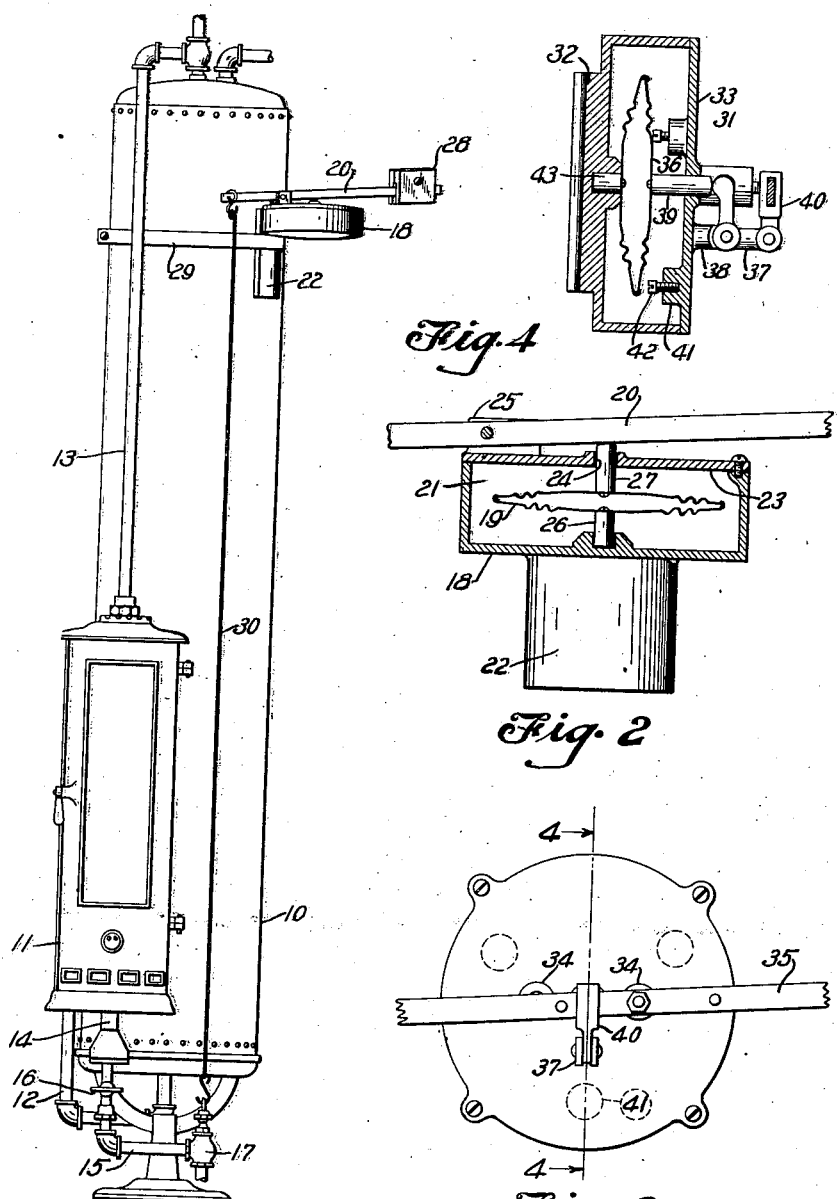
INVENTORS.
Otto J. Gross
BY Jay H. Woolhiser
H. E. Heath
ATTORNEY.

Patented Jan. 18, 1938

2,106,001

UNITED STATES PATENT OFFICE 2,106,001

THERMOSTATIC CONTROL DEVICE

Otto J. Gross and Jay H. Woolhiser, Elmhurst, N. Y.

Application November 17, 1933, Serial No. 698,443

1 Claim. (Cl. 236—32)

Our invention relates to a thermostatic control device for heaters and has as its object the provision of such a device that is simple and rugged, and which may be quickly installed, especially in existing systems as, for instance, combinations of water storage tank and heater.

It is a further object to provide a control device for water heaters that is quickly adjustable to maintain any desired quantity of hot water within the capacity of the storage tank.

A typical installation to which our device is adaptable comprises an upright cylindrical water storage tank and a heater through which water circulates from the bottom to the top of the tank. We provide a temperature responsive element of a very simple and rugged type provided with means for attachment to the tank such that it may be quickly located at any level, and utilize an adjustable length medium such as a light chain for transmitting movement of the temperature responsive element to the control valve or dampers of the heater.

Our invention will be more fully understood by reference to the following description taken in connection with the accompanying drawing in which;

Fig. 1 shows our device installed on a water storage tank for controlling an associated gas operated water heater;

Fig. 2, a vertical section of the thermostatic device in Fig. 1;

Fig. 3, a modified form of our device shown in elevation; and

Fig. 4, a section on line 4—4 of Fig. 3.

Referring to Figs. 1 and 2 of the drawing, an upright cylindrical tank 10 is connected at the bottom and top to a heater 11 by pipes 12 and 13 respectively. The heater is of a well known type comprising a copper coil, not shown, heated by a gas burner 14 and inclosed in a suitable casing. The burner is supplied with gas by a pipe 15 provided with a shut-off valve 16 and a suitable control valve 17. It will be understood that valve 17 is provided with a minimum flame bypass or a pilot tube provided for lighting the burner. This is not illustrated, being well known in the art.

Heretofore, a thermostatic element has been directly connected for operation of the valve 17, wherefore the gas pipe 15 must extend adjacent the location of the thermostat on the storage tank thus fixing the position of the element unless considerable alteration is contemplated. Such thermostatic valves also necessitate additional piping for application to an existing installation.

We provide a thermostatic operating element comprising, essentially, a casing 18, expansible fluid thermostat 19, and lever 20. The casing 18 preferably comprises an integral aluminum casting forming a shallow cylindrical chamber 21 and a back plate or block 22 having its rear face curved to substantially conform to the curvature of the storage tank 10 for good thermal contact therewith when mounted thereon as hereinafter described. A cast cover plate 23 for the chamber 21 is provided with a central opening 24 and a split boss forming a pivot post 25. In the chamber 21 is located the sensitive element 19 which is shown schematically being of the well known and simple expansible diaphragm type containing an expansible fluid such as, for example, ether or a mixture of ether and alcohol. The diaphragm may rest freely in the chamber 21 or be guided by lug 26 seated in the bottom of the chamber as shown. A lug 27 on the other side of the diaphragm 19 extends through the aperture 24 in the cover plate in operative relation to the lever 20 pivoted in the split boss 25. A weight 28 is slidably mounted on the lever 20 for adjustment of operating temperature in a well known manner.

The thermostat is secured on the storage tank 10 by a strap or band 29 extending around the tank and the back plate 22 of the thermostat. The curvature of the plate and tank prevents twisting under the strap. The unweighted end of the lever 20 is operatively connected to the valve 17 by a cord, wire, or chain 30. Valve 17 is of any suitable normally closed type, meaning it is biased to its closed position. When the thermostat is in inoperative position, the weight 28 holds the valve 17 open, allowing the heater to operate to add hot water to the top of the tank. When the water at the thermostat level reaches a predetermined temperature, pressure of the diaphragm 19 raises the lever 20 against the weight 28 to allow the valve 17 to close and shut off the burner.

The operating temperature of the thermostat may be adjusted by shifting the weight 28. If it is desired to store more hot water in the tank 10, the strap 29 is loosened to lower the thermostat and the chain 30 correspondingly shortened. We consider the ease of this adjustment an important feature of the invention.

The modified device shown in Figs. 3 and 4 is very similar to that just described except that the diaphragm chamber 31 is vertical, that is, turned at right angles to that previously described, and the leverage correspondingly altered. The back plate 32, curved as mentioned above, and the diaphragm chamber 31 are formed by a single casting. The cover plate 33 is provided exteriorly with a boss 34 on each side of the central aperture so the pivot point of the lever 35 may be shifted to adjust the operating temperature. The expansible diaphragm 36 is operatively associated with the lever 35 by a bellcrank 37 pivoted on a boss 38 and having one end opposite the aperture for engagement by the diaphragm lug 39 and the other end connected to the lever 35 by a link 40. The link 40 is saddled on the lever 35 loosely enough to permit a slight arcuate movement necessary for the bellcrank 37. Three bosses 41 on the interior of the cover plate 33 are tapped for screws 42 which are adjusted to prevent the diaphragm lug 43 from leaving its guide in the casing when the diaphragm is in its collapsed position.

It will be understood that our device is equally applicable to installations using coal burning heaters, furnaces, or the like. In such installations the thermostat lever is connected to raise and lower the dampers on the heater or furnace in a manner well known in the art.

It will be apparent to those skilled in the art that various other changes may be made in the construction and arrangement without departing from the spirit of the invention, and therefore the invention is not limited to that which is described in the specification and shown in the drawing, but only as indicated in the following claim.

We claim:

A temperature regulator for a heating system comprising the combination of a metal casing consisting of a part forming a chamber and a part forming a removable cover for said chamber and having an aperture therethrough, an expansible diaphragm fluid thermostat, a lever pivoted on the outside of said cover, and a member movable in said aperture for moving said lever, said diaphragm being loose in said chamber so as to be readily removed or replaced when said cover is removed, expansion of said diaphragm causing movement of said aperture member and said lever, and said casing having an outer surface shaped so that the regulator may be placed against an outer surface portion of the heating system in good thermal contact therewith.

OTTO J. GROSS.
JAY H. WOOLHISER.